Patented June 2, 1931

1,808,594

UNITED STATES PATENT OFFICE

GEORGES AUGUSTE LOUIS ROBERT COLLARD, OF VIENNE (ISERE), FRANCE, ASSIGNOR TO COMPTOIR LYON-ALEMAND, OF PARIS, FRANCE, A JOINT-STOCK COMPANY OF FRANCE

PROCESS FOR SEPARATING PLATINUM FROM THE OTHER PRECIOUS METALS

No Drawing. Application filed January 28, 1928, Serial No. 250,342, and in France February 4, 1927.

The present invention relates to a process for separating platinum from the other precious metals, such process being more particularly applicable to recovering the precious metals contained in "goldsmith's ash", that is to say, in the waste, filings and the like, produced during the finishing off of articles made of precious metal, or in electrolytic sediments and the like.

Such goldsmith's ash generally contains gold, silver, platinum and copper, and in order to recover each of the aforesaid precious metals, a process has already been proposed which consists in treating the goldsmith's ash in the following manner: the mixture hereinafter termed fusion bed and containing goldsmith's ash, lead oxides (litharge), matte, slags of silica, iron oxide and calcium compounds, various thio-oxidizing agents intended to form the copper absorbing matte, and metallurgical coke, is fused in a small shaft furnace. At the temperature of the furnace, the carbon monoxide given off by the burning coke reduces the lead oxides to form metallic lead which acts as a solvent for the precious metals. The slag is drawn off at intervals through the cinder notch and when the crucible is filled by the bath (matte and lead) the tapping hole is unstopped. The matte cools first and very rapidly, which enables it to be removed, and lead containing the precious metals in solution remains behind. The lead ingots thus obtained are subjected to cupellation, as a result of which, an alloy of the precious metals, gold, silver, and platinum, is obtained. Said alloy is then subjected to various refining operations with the object of separating out each of the precious metals. Such refining operations are lengthy and costly especially as regards the separation of the platinum from the gold and silver.

The process according to the present invention simplifies these operations considerably, and it is essentially characterized by the fact that, previous to the treatment of the goldsmith's ash in the manner described above copper is added to said ash, in the proportion of 1% at least by weight of the quantity of lead contained in the fusion bed. Since the goldsmith's ash already contains a certain quantity of copper and as there is added to the fusion bed the exact quantity of thio-oxidizing agents required for absorbing such quantity of copper, the copper added is in excess and cannot be absorbed by the thio-oxidizing agents. The copper has the property of causing the mixture, after the molten mass has cooled, to divide into two separate bodies, one of which only contains gold and silver and a slight quantity of copper mixed with the lead, while the other, which is deposited above the first in the pasty state, contains all the platinum, the greater part of the copper, and traces of gold and silver.

According to the present invention, the platinous mass obtained, and which contains all the platinum, is subjected to cupellation in a bath of lead which must not contain any copper impurities. Said lead bath enables the great quantity of copper contained in the platinous mass to be eliminated, so that after cupellation a residue is obtained consisting of ingots of an alloy of gold, silver and platinum.

The platinous mass containing a substantial quantity of copper is placed in a bath of lead and the mass is suddenly cooled, whereby the lead forms an intimate mixture with the platinous mass. If the mass is then slowly heated to a certain temperature, the copper will separate out, leaving the platinum contained in the lead. The process of cupellation may now be resorted to. This consists, as is well known, in heating the mass of lead and platinum in a current of air. The lead oxidizes and can be run off, leaving the platinum.

According to the present invention, said gold, silver and platinum ingots can then be treated again according to the above described process which enables the platinum content of the ingots to be substantially increased.

An important feature of the present invention is that the means employed to cause the platinum to separate out and concentrate in what has been termed the platinous mass have no chemical action on the gold and silver contained in the non-platinous mass of such a nature as to preclude the possibility of separating out the gold and silver. On the contrary, the non-platinous lead ingots obtained, as indicated above, simultaneously with the platinous mass and which only contain gold and silver as precious metals, will be treated according to the known processes to separate out said precious metals. Accordingly, they will be subjected to cupellation whereby the lead and copper can be eliminated and gold and silver ingots obtained. These latter will then be refined, which will be a relatively simple matter, since the ingots no longer contain platinum.

The process according to the present invention will consequently enable the operations relating on the one hand to the separation of the platinum and, on the other hand, to the separation of the gold and silver, to be greatly simplified, so that great economy will consequently be achieved.

By way of example, it may be stated that on treating a mass of goldsmith's dust containing approximately 5 grams of platinum and 1000 grams of gold and silver, by the process according to the present invention, a platinous mass can be extracted therefrom of only a quarter of the weight of the total original mass, the non-platinous mass thus comprising three-quarters of the total mass. It will be readily understood that after such treatment the platinum is concentrated in a mass of reduced weight.

The refining operations enabling the platinum to be separated out will be consequently far less laborious.

It is moreover self evident that the invention has only been described and represented here in a purely explanatory but by no means limitative manner, and that it could be subjected to various modifications of detail without departing from the spirit thereof.

In the following claims, the term fusion bed has the same meaning as has been previously explained.

I claim:

1. A process for separating platinum from gold and silver which consists in forming a mixture of goldsmith's ash, lead oxide, matte, slags of silica, iron oxide and calcium compounds, thio-oxidizing agents and metallurgical coke; adding copper to said mixture sufficiently in excess of the amount affected by the thio-oxidizing agents in order to fractionally separate the platinum; fusing the mass obtained; and cooling said mass.

2. A process for separating platinum from gold and silver which consists in forming a mixture of goldsmith's ash, lead oxides, matte, slags of silica, iron oxide and calcium compounds, thio-oxidizing agents and metallurgical coke; adding copper to said mixture in the proportion of not less than 1% by weight of the lead; fusing the mass obtained; and cooling said mass.

3. A process for separating platinum from gold and silver and permitting said precious metals to be recovered from goldsmith's ash, said process consisting in adding to a fusion bed composed of goldsmith's ash, matte, slags of silica, lead oxides, iron oxides and calcium compounds, copper in the proportion of not less than 1% by weight of the lead; in melting the mixture obtained; in cooling said mixture; and in subjecting the platinous mass to the action of lead to remove the platinum from the copper and then cupelling the resulting lead-platinum mass to remove the lead from the platinum.

4. A process for separating platinum from gold and silver and permitting said precious metals to be recovered from the material in which they are contained, said process consisting in adding copper to a fusion bed of goldsmith's ash, matte, slags of silica, lead oxides, iron oxides and calcium in the proportion of not less than 1% by weight of the lead contained therein; in melting the mixture obtained; in cooling said mixture; and in subjecting the platinous mass to the action of lead to remove the platinum from the copper and then cupelling the resulting lead-platinum mass to remove the lead from the platinum.

5. A process for separating platinum from gold and silver and permitting said precious metals to be recovered from goldsmith's ash, said process consisting in adding to a fusion bed of goldsmith's ash, matte, slags of silica, lead oxides, iron oxides and calcium compounds, copper in the proportion of not less than 1% by weight of the lead; in melting the mixture obtained; in cooling said mixture; in subjecting the platinous mass which separates out from said cooled mixture to cupellation in a bath of lead containing no copper impurities; in subjecting the non-platinous mass which separates out from said cooled mixture to cupellation; and in refining the ingots obtained.

6. A process for separating platinum from gold and silver and permitting said precious metals to be recovered from the material in which they are contained, said process consisting in adding copper to a fusion bed of goldsmith's ash, matte, slags of silica, lead oxides, iron oxides and calcium compounds, in the proportion of not less than 1% by weight of the lead contained therein; in melting the mixture obtained; in cooling said mixture; in subjecting the platinous mass which separates out from said cooled mixture to cupellation in a bath of lead containing no copper impurities; in subjecting the non-platinous mass which separates out from said cooled mixture to cupellation, and in refining the ingots obtained.

7. A process for separating platinum from gold and silver and permitting said precious metals to be recovered from goldsmith's ash, said process consisting in adding to a fusion bed of goldsmith's ash, matte, slags of silica, lead oxides, iron oxides and calcium compounds, copper in the proportion of not less than 1% by weight of the lead; in melting the mixture obtained; in cooling said mixture; in subjecting the platinous mass to the action of lead to remove the platinum from the copper and then cupelling the resulting lead-platinum mass to remove the lead from the platinum; and in repeating the process with the resultant lead ingots obtained.

8. A process for separating platinum from gold and silver and permitting said precious metals to be recovered from the material in which they are contained, said process consisting in adding copper to a fusion bed of goldsmith's ash, matte, slags of silica, lead oxides, iron oxides and calcium compounds in the proportion of not less than 1% by weight of the lead contained therein; in melting the mixture obtained; in cooling said mixture; in subjecting the platinous mass to the action of lead to remove the platinum from the copper and then cupelling the resulting lead-platinum to remove the lead from the platinum; and in repeating the process with the resultant lead ingots obtained.

GEORGES AUGUSTE LOUIS ROBERT COLLARD.